United States Patent [19]
Watanabe

[11] Patent Number: 5,887,336
[45] Date of Patent: Mar. 30, 1999

[54] METHOD OF PRELIMINARILY SMOOTHING A MAGNETIC DISK DRIVE HEAD DURING MANUFACTURING

[75] Inventor: Fumitake Watanabe, Tokyo, Japan

[73] Assignee: NEC Corporation, Tokyo, Japan

[21] Appl. No.: 861,425

[22] Filed: May 21, 1997

Related U.S. Application Data

[62] Division of Ser. No. 612,003, Mar. 5, 1996, abandoned.

[30] Foreign Application Priority Data

Mar. 8, 1995 [JP] Japan ...................................... 7-48363

[51] Int. Cl.$^6$ ....................................................... G11B 5/42
[52] U.S. Cl. ..................................... 29/603.16; 360/97.01
[58] Field of Search ........................... 29/603.16, 603.17; 360/97.01, 98.01, 122, 125, 126, 128, 131, 133, 135, 137

[56] References Cited

U.S. PATENT DOCUMENTS

| | | | |
|---|---|---|---|
| 3,648,361 | 3/1972 | Yagi et al. ........................ | 29/603.17 X |
| 5,083,365 | 1/1992 | Matsumoto . | |
| 5,285,343 | 2/1994 | Tanaka et al. . | |
| 5,427,833 | 6/1995 | Nakayama et al. . | |

FOREIGN PATENT DOCUMENTS

| | | |
|---|---|---|
| 0 218 811 | 4/1987 | European Pat. Off. . |
| 0 583 985 | 2/1994 | European Pat. Off. . |
| 0 583 989 | 2/1994 | European Pat. Off. . |
| 56-047958 | 4/1981 | Japan . |
| 60-40530 | 3/1985 | Japan . |
| 2-146109 | 6/1990 | Japan . |
| 4-172616 | 6/1992 | Japan . |
| 5-205220 | 8/1993 | Japan . |
| 5-334665 | 12/1993 | Japan . |
| 6-103563 | 4/1994 | Japan . |

OTHER PUBLICATIONS

"Diamond Burnishing Head for Reduction of Disk Asperities in Magnetic Recording Disks", IBM Technical Disclosure Bulletin, vol. 27, No. 10A, Mar. 1985, p. 5553.

"Magnetic Recording Disk with High Start/Stop Durablility and Low Magnetic Errors", IBM Technical Disclosure Bulletin, vol. 23, No. 1, Jun. 1980, p. 306.

*Primary Examiner*—Carl E. Hall
*Attorney, Agent, or Firm*—Young & Thompson

[57] ABSTRACT

A magnetic disk drive having at least a contact magnetic head and at least a magnetic disk including a recording area and an abrasion promoting area is preliminarily operated after the magnetic head and the magnetic disk are mounted thereon and prior to a normal recording and reproducing operation thereof, to abrade the magnetic head by using the abrasion promoting area. The abrasion promoting area is provided by making its surface roughness larger than that of the recording area by forming a lubricant film on only the recording area. By preliminarily abrading the magnetic head by means of the abrasion promoting area, a contact of the magnetic head with the magnetic disk is improve and a desired recording and reproducing characteristics of the magnetic disk drive is obtained.

6 Claims, 2 Drawing Sheets

METHOD OF PRELIMINARILY SMOOTHING A MAGNETIC DISK DRIVE HEAD DURING MANUFACTURING

This application is a division of application Ser. No. 08/612,003, filed Mar. 5, 1996, now abandoned.

BACKGROUND OF THE INVENTION

The present invention relates to a magnetic disk drive and, particularly, to a magnetic disk drive in which a recording and reproducing operation is performed while a magnetic head of the magnetic disk drive is made in contact with a magnetic disk and a method of manufacturing the magnetic disk drive.

The recording density of magnetic disks in a magnetic disk drive used as an external memory for such as a computer system has been increased at high rate. As a result, the flying height of a magnetic head becomes smaller and smaller and, recently, it becomes as small as 0.1 $\mu$m or less. It is expected that, in the near future, a contact recording system, in which magnetic heads perform a recording and reproducing operation while they are always in contact with magnetic disks, shall be used.

Each of U.S. Pat. No. 5,041,932 (referred to as article 1) and Japanese Patent Application Laid-open No. H5-114116 (referred to as article 2) discloses a magnetic head structure suitable for such contact recording and reproducing system and a method of manufacturing the magnetic head structure. In these articles, a technique for recording and reproducing information is disclosed in which a small contact pad having a magnetic recording/reproducing pole portion embedded therein is in sliding contact with the magnetic disk.

A problem inherent to the contact recording and reproducing system is an abrasion of the magnetic head and/or the magnetic disk due to the sliding contact therebetween. However, this problem has become practically negligible for the magnetic disk drive by a use of a carbon material in the contact pad portion and/or a protective layer on the magnetic disk, a reduction of weight of the magnetic head, a reduction of load of the head and an employment of a perpendicular magnetic recording system, etc.

In the perpendicular magnetic recording system, it has been known that a recording and reproducing characteristics of the system varies with a minute variation of contacting state between the magnetic head, particularly, the pole portion, and the magnetic disk. For example, in the above mentioned contact recording and reproducing system, a slight roll angle of the magnetic head with respect to the magnetic disk affects the recording and reproducing characteristics considerably and, in some case, there may be a case where a desired recording and reproducing characteristics can not be obtained. As described in "IEEE Transactions on Magnetics", Vol. 27, No. 6, Page 4923, November 1991 (referred to as article 3), in order to guarantee a reliable contact between a magnetic head and a magnetic disk, that is, to obtain a desired recording and reproducing characteristics of a magnetic disk drive, a preliminary operation is required to preliminarily abrade the magnetic head prior to a normal recording and reproducing operation. As mentioned previously, however, the preliminary operation takes a long time since the magnetic head and magnetic disk system is designed such that an abrasion is restricted to suitable a low level.

Although the article 3 mentions the necessity of preliminary smoothing operation, that is, an initial head abrasion, in order to ensure the contact of the contact head and the magnetic disk, it does not disclose any concrete mean for performing the same. The article 1 is completely silent on the preliminary smoothing operation.

SUMMARY OF THE INVENTION

An object of the present invention is to provide a magnetic disk drive which can perform such preliminary smoothing operation efficiently and a method of manufacturing the magnetic disk drive.

The above object can be achieved according to the present invention by employing a magnetic disk which has an area for promoting an abrasion of a magnetic head during a sliding contact with a magnetic head.

According to one aspect of the present invention, there is provided a magnetic disk drive comprising at least a contact type magnetic head and at least a magnetic disk, wherein the magnetic disk includes a recording and reproducing area and an abrasion promoting area having surface roughness larger than that of the recording and reproducing area.

According to another aspect of the present invention, there is provided a method of manufacturing a magnetic disk drive comprising at least a contact type magnetic head and at least a magnetic disk including a recording and reproducing area and an abrasion promoting area having surface roughness larger than that of the recording and reproducing area, wherein the method comprises the step of preliminarily performing a smoothing operation with the abrasion promoting area after the contact type magnetic head and the magnetic disk are assembled in the magnetic disk drive.

DESCRIPTION OF THE PREFERRED EMBODIMENTS

The present invention will be described in detail with reference to the accompanying drawings.

Figure 1:
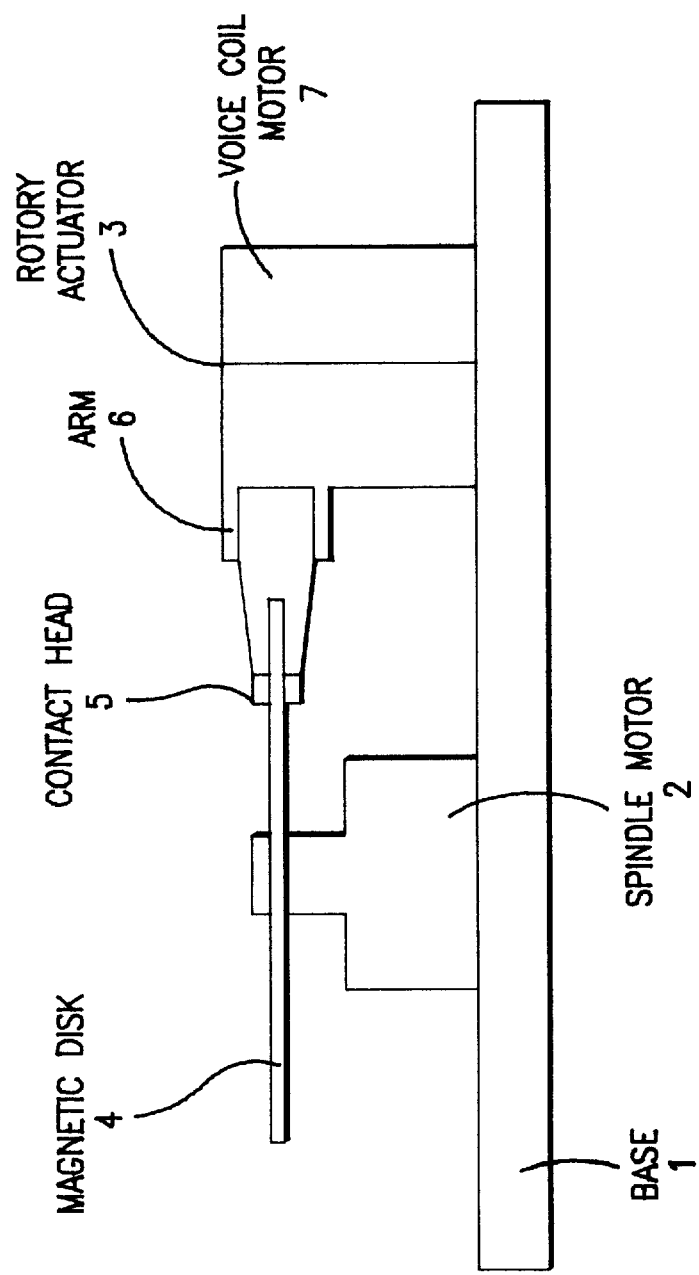
FIG. 1 is a schematic side view of an embodiment of a magnetic disk drive according to the present invention.

FIG. 1 is a schematic side view of an embodiment of a magnetic disk drive according to the present invention. In FIG. 1, a spindle motor 2 and a rotary actuator 3 are provided on a base 1. A magnetic disk 4 is mounted on the spindle motor 2 and a contact type magnetic head 5 is mounted on the rotary actuator 3 through an arm 6. The contact type magnetic head 5 is arranged on the magnetic disk 4 and movable in a radial direction of the magnetic disk 4 by a voice coil motor 7 so that it can be positioned at a desired track of the disk 4.

Figure 2:
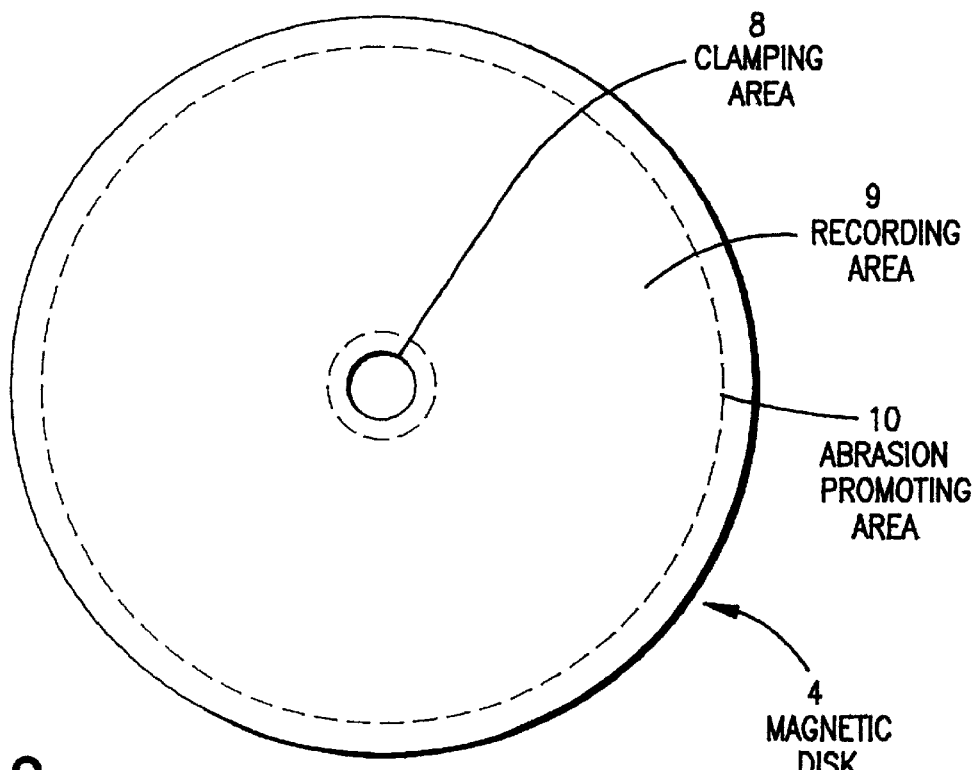
FIG. 2 is a plan view of one of magnetic disks incorporated in the magnetic disk drive according to the present invention.

FIG. 2 shows the magnetic disk 4 mounted on the magnetic disk drive according to an embodiment of the present invention. The magnetic disk 4 is obtained by forming, on an aluminum substrate, a nickel-iron (NiFe) layer having thickness of 5~8 $\mu$m, a cobalt-chromium-tantalum (CoCrTa) layer having thickness of 70~90 nm, an amorphous carbon layer having thickness of ~10 nm and a lubrication layer having thickness of 2~5 nm, in the order.

As shown in FIG. 2, the magnetic disk 4 includes a clamping area 8 around a center portion thereof for fixing it on the spindle motor shaft and a movable area outside of the clamping area 8, on which the magnetic head is movable. The movable area includes a recording area 9 and an abrasion promoting area 10 which is provided in an outer peripheral edge portion of the magnetic disk. The abrasion promoting area 10 is formed by partially applying a tape polishing method to be described later to that area. The abrasion promoting area 10 has surface roughness larger than that of the recording area 9 and so an abrading rate of the magnetic head in sliding contact with the abrasion promoting area 10 of the magnetic disk is larger than that of the head in sliding contact with the recording area 9. Expressing the surface roughness by Ra value, those of the abrasion promoting area 10 and the recording area 9 are 5~10 nm and 0.5~1 nm, respectively, that is, the surface roughness of the abrasion promoting area 10 is about 10 times that of the recording area 9. Width of the abrasion promoting area 10 is about 1~2 mm when a diameter of the disk is 1.8 inches.

The abrasion promoting area 10 and the recording area 9 of the magnetic disk, which are different in surface roughness, are provided as follow:

First, a surface of the disk substrate of aluminum alloy is polished by-using a polishing pad or a buff tape while supplying slurry of alumina, silicon carbide or diamond thereto such that a whole surface of the substrate has a predetermined small surface roughness. Then, the abrasion promoting area 10 having a desired surface roughness is formed by performing a partial tape polishing with respect to a desired portion of the disk surface. When the disk substrate is of glass, the abrasion promoting area can be formed partially thereon by using a laser texturing method as disclosed in U.S. Pat. No. 5,062,021.

The recording and reproducing characteristics of the magnetic disk drives according to the present invention were measured immediately after the magnetic disk drives were assembled. It has been found that the reproudcing outputs of 15~20% of the magnetic disk drives were short. Then, the defective magnetic disk drives whose reproducing outputs were short were preliminarily operated for three (3) days by putting the magnetic head in sliding contact with the abrasion promoting areas thereof. 90% or more of the defective magnetic disk drives preliminarily operated for three days exhibited desired recording and reproducing characteristics.

Thus, the magnetic disk drive can be manufactured efficiently at high yield by incorporating the preliminary smoothing operation after the assembling of the magnetic heads and the magnetic disks.

On the other hand, the magnetic disk drives mounted with conventional magnetic disks having no abrasion promoting area were preliminarily operated for three days after the assembling thereof and the recording and reproducing characteristics thereof were measured. 10% of the disk drives at most were improved in the recording and reproducing characteristics. However, about 90% of them required preliminary smoothing operation for a time longer than three days in order to obtain acceptable characteristics.

Although the embodiment in which, in order to promote abrasion of the magnetic head, the surface roughness of the magnetic disk is partially increased, has been described, the abrasion promoting area may be provided by partially not supplying lubricant to the disk.

A method for not supplying lubricant to a disk surface partially will be described. The method utilizes the spin-coating. That is, in a usual spin-coating, lubricant solution is dropped onto an area of a rotating disk in the vicinity of a center thereof and then a rotation speed of the disk is increased to spread the lubricant solution over a whole surface of the disk. In such spin-coating, it is possible to provide an area around an inner peripheral portion of the surface of the magnetic disk, which is not to be wetted with the lubricant solution, by suitably selecting the coating condition such as a dropping position of the lubricant solution.

Alternatively, it is possible to coat the whole surface of the disk with the lubricant solution by means of the spin-coating or the dipping method and then remove the lubricant solution on a desired area of the disk surface by using a cloth, etc.

Figure 3:
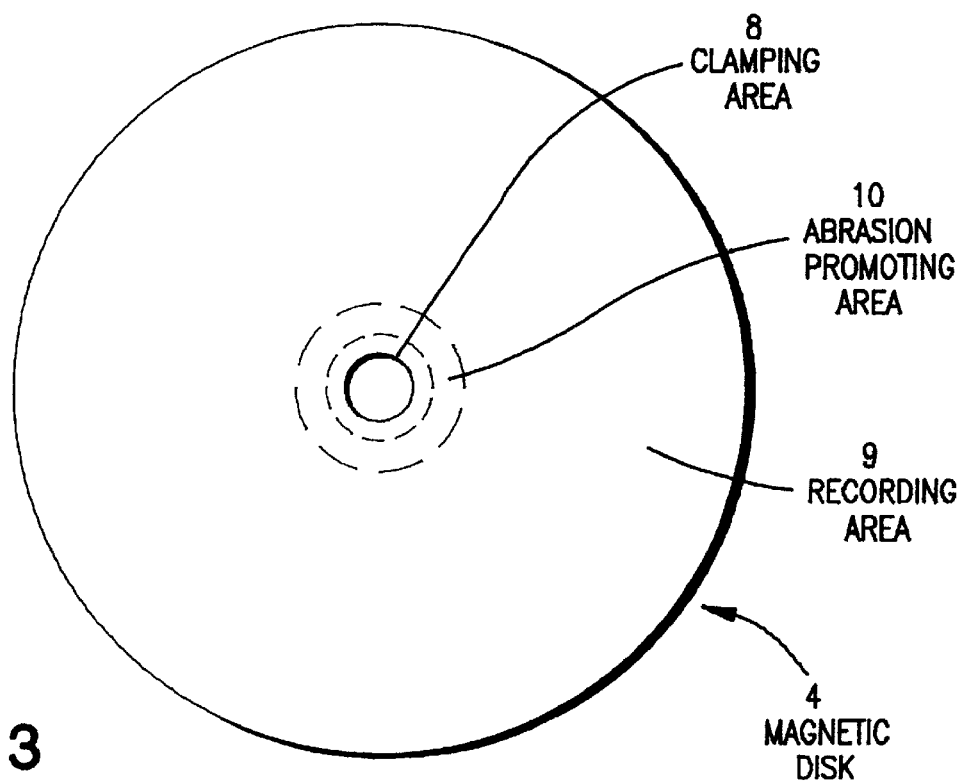
FIG. 3 is plan view of another magnetic disk incorporated in the magnetic disk drive according to the present invention.

FIG. 3 shows another embodiment of the present invention. In FIG. 3, a magnetic disk 4 is obtained by forming, on a disk substrate of glass having diameter of 1.8 inches, a nickel-iron (NiFe) layer having thickness of 5~8 $\mu$m, a cohalt-chromium-tantalum (CoCrTa) layer having thickness of 70~90 nm, an amorphous carbon layer having thickness of ~10 nm and a lubrication layer having thickness of 2~5 nm, in the order, as in the first embodiment.

As shown in FIG. 3, the magnetic disk 4 includes a clamping area 8 and a movable area including a recording area 9 and an abrasion promoting area 10 as in the first embodiment shown in FIG. 2. The second embodiment shown in FIG. 3 differs from the first embodiment in that the abrasion promoting area 10 about 2 mm wide is formed on the side of an inner peripheral portion of the magnetic disk. The formation of the abrasion promoting area 10 will be described. First, a whole surface of the glass substrate is smoothed to the order of Ra=0.5~1 nm and then a number of minute lands are formed in an inner area of the glass substrate, on which the abrasion promoting area is to be formed, by irradiating the area with laser pulses. Each minute land takes in the form of a ring having diameter of about 20 $\mu$m and height of about 20~30 nm. Density of the minute lands in the abrasion promoting area is about 200 lands/mm$^2$.

Then, the nickel-iron layer, the cobalt-chromium-tantalum layer and the amorphous carbon layer are formed as mentioned above. Thereafter, the disk is spin-coated with a lubricant solution. In this spin-coating, the lubricant solution is dropped onto a position of the rotating disk surface which is slightly outside of the abrasion enhancing area 10 so that only the recording area 9 outside of the abrasion promoting area 10 is coated therewith.

A magnetic disk drive is assembled with the magnetic disk thus manufactured in a similar manner to that used in the first embodiment. Then, the recording and reproducing characteristics of the magnetic disk drives according to the second embodiment were measured. It has been found that the reproducing outputs of 15~20% of the magnetic disk drives were short. The defective magnetic disk drives whose reproducing outputs were short were operated for one (1) day by sliding the magnetic head on the abrasion promoting areas thereof. About 85% or more of the defective magnetic disk drives preliminarily operated for one day exhibited desired recording and reproducing characteristics.

On the other hand, the magnetic disk drives mounted with conventional magnetic disks having no abrasion promoting area were preliminarily operated for theee days after the assembling thereof and the recording and reproducing characteristics thereof were measured in the same manner as in the first embodiment. 10% of the disk drives at most were improved in the recording and producing characteristics by the preliminary smoothing operation for three days.

However, the remaining defective magnetic disk drives required preliminary smoothing operation for a time longer than three days in order to obtain acceptable characteristics.

As described hereinbefore, the magnetic disk drive according to the present invention, which employs a magnetic disk having an abrasion promoting area, can be manufactured efficiently at high yield since, even when a contact state of a magnetic head with the magnetic disk is not suitable, the contact is improved due to the fact that the magnetic head is abraded suitable by a preliminary smoothing operation for a relatively short time.

Modifications of the present invention herein disclosed will occur to a person skilled in the art and all such modifications are deemed to be within the scope of the present invention as defined by the appended claims.

What is claimed is:

1. A method of manufacturing a magnetic disk drive comprising at least a contact type magnetic head and at least a magnetic disk including a recording and reproducing area and an abrasion promoting area for abrading said contact type magnetic head, wherein said method comprises the step of preliminarily operating said magnetic disk drive after said contact type head and said magnetic disk are mounted thereon and prior to a normal recording and reproducing operation of said magnetic disk drive, to abrade said magnetic head by using said abrasion promoting area.

2. The method of claim 1, further comprising the step of providing the abrasion promoting area with a surface roughness approximately ten times the surface roughness of the recording area of the magnetic disk.

3. The method of claim 1, further comprising the step of providing the abrasion promoting area by selectively applying lubricant to the magnetic disk.

4. The method of claim 1, further comprising the step of providing the abrasion promoting area by laser pulse irradiating the magnetic disk to form minute lands.

5. The method of claim 4, wherein said step of forming minute lands forms lands comprising rings having a diameter of about 20 $\mu$m and a height of about 20 to 30 $\mu$m.

6. The method of claim 5, wherein said step of forming minute lands provides approximately 200 lands/mm$^2$.

* * * * *